US008661096B2

(12) United States Patent
Chou

(10) Patent No.: US 8,661,096 B2
(45) Date of Patent: Feb. 25, 2014

(54) COLLABORATIVE EDITING IN A VIDEO EDITING SYSTEM

(75) Inventor: Hung-Te Chou, Shulin (TW)

(73) Assignee: Cyberlink Corp., Shindian, Taipei (TW)

( * ) Notice: Subject to any disclaimer, the term of this patent is extended or adjusted under 35 U.S.C. 154(b) by 924 days.

(21) Appl. No.: 11/982,812

(22) Filed: Nov. 5, 2007

(65) Prior Publication Data
US 2009/0119369 A1    May 7, 2009

(51) Int. Cl.
*G06F 15/16* (2006.01)
*G06F 15/173* (2006.01)

(52) U.S. Cl.
USPC ............................ 709/219; 709/203; 709/204

(58) Field of Classification Search
USPC .................................................. 709/231, 219
See application file for complete search history.

(56) References Cited

U.S. PATENT DOCUMENTS

| | | | | |
|---|---|---|---|---|
| 5,892,915 A * | 4/1999 | Duso et al. | ..................... | 709/219 |
| 5,918,012 A * | 6/1999 | Astiz et al. | ..................... | 709/217 |
| 6,154,771 A * | 11/2000 | Rangan et al. | ................. | 709/217 |
| 6,415,303 B1 * | 7/2002 | Meier et al. | ..................... | 715/202 |
| 6,463,444 B1 * | 10/2002 | Jain et al. | ............................... | 1/1 |
| 6,476,826 B1 * | 11/2002 | Plotkin et al. | ................. | 715/723 |
| 6,642,940 B1 * | 11/2003 | Dakss et al. | ................... | 715/723 |
| 6,646,655 B1 * | 11/2003 | Brandt et al. | ................. | 715/723 |
| 6,674,955 B2 * | 1/2004 | Matsui et al. | ................. | 386/281 |
| 6,721,361 B1 * | 4/2004 | Covell et al. | ............. | 375/240.14 |
| 6,954,900 B2 * | 10/2005 | Yu et al. | ......................... | 715/723 |
| 7,024,677 B1 * | 4/2006 | Snyder et al. | ................... | 725/86 |
| 7,054,539 B2 * | 5/2006 | Ito et al. | ......................... | 386/248 |
| 7,277,621 B2 * | 10/2007 | Kunieda et al. | ................ | 386/281 |
| 7,325,199 B1 * | 1/2008 | Reid | ................................ | 715/723 |
| 7,383,504 B1 * | 6/2008 | Divakaran et al. | ............. | 715/723 |
| 7,383,508 B2 * | 6/2008 | Toyama et al. | ................ | 715/723 |
| 7,432,940 B2 * | 10/2008 | Brook et al. | ................... | 345/629 |
| 7,511,718 B2 * | 3/2009 | Subramanian et al. | ........ | 345/619 |
| 7,559,017 B2 * | 7/2009 | Datar et al. | ..................... | 715/230 |
| 7,567,671 B2 * | 7/2009 | Gupte | ............................ | 380/239 |
| 7,660,416 B1 * | 2/2010 | Kline | ............................. | 380/216 |
| 7,683,940 B2 * | 3/2010 | Fleming | ...................... | 348/222.1 |
| 7,739,599 B2 * | 6/2010 | Patten et al. | ................... | 715/723 |
| 7,757,171 B1 * | 7/2010 | Wong et al. | .................... | 715/719 |
| 7,827,281 B2 * | 11/2010 | Abbott et al. | ................. | 709/225 |
| 7,849,406 B2 * | 12/2010 | Okada et al. | ................... | 715/723 |
| 7,876,357 B2 * | 1/2011 | Jung et al. | ................... | 348/207.1 |
| 7,877,690 B2 * | 1/2011 | Margulis | ........................ | 715/723 |
| 7,983,526 B2 * | 7/2011 | Ando et al. | ................... | 386/240 |
| 7,996,772 B2 * | 8/2011 | Lee et al. | ....................... | 715/730 |

(Continued)

OTHER PUBLICATIONS

Mackay, W. E. and Davenport, G. 1989. Virtual video editing in interactive multimedia applications. Commun. ACM 32, 7 (Jul. 1989), 802-810.*

(Continued)

*Primary Examiner* — Melvin H Pollack
(74) *Attorney, Agent, or Firm* — McClure, Qualey & Rodak, LLP

(57) ABSTRACT

Included are embodiments of a method for collaborative editing. At least one embodiment includes receiving an indication to include at least one media effect with at least one media segment and sending at least one media attribute associated with the at least one media segment to a remote server. Some embodiments include receiving data related to at least one determined media effect, the at least one determined media effect being determined from the at least one media attribute.

22 Claims, 17 Drawing Sheets

(56) References Cited

U.S. PATENT DOCUMENTS

| | | | |
|---|---|---|---|
| 8,006,186 B2* | 8/2011 | Kellock et al. | 715/728 |
| 8,023,799 B2* | 9/2011 | Shinkai et al. | 386/281 |
| 8,028,314 B1* | 9/2011 | Sezan et al. | 725/46 |
| 8,032,649 B2* | 10/2011 | Gupta et al. | 709/231 |
| 8,041,189 B2* | 10/2011 | Shinkai et al. | 386/281 |
| 8,082,366 B2* | 12/2011 | Shinkai et al. | 709/246 |
| 8,156,176 B2* | 4/2012 | Lerman et al. | 709/203 |
| 8,156,532 B2* | 4/2012 | Shinkai | 725/116 |
| 8,161,452 B2* | 4/2012 | Creighton et al. | 717/100 |
| 8,180,826 B2* | 5/2012 | Hua et al. | 709/203 |
| 8,230,343 B2* | 7/2012 | Logan et al. | 715/723 |
| 2001/0003846 A1* | 6/2001 | Rowe et al. | 725/47 |
| 2001/0004417 A1* | 6/2001 | Narutoshi et al. | 386/52 |
| 2003/0023757 A1* | 1/2003 | Ishioka et al. | 709/231 |
| 2003/0206190 A1* | 11/2003 | Saito et al. | 345/723 |
| 2004/0001106 A1* | 1/2004 | Deutscher et al. | 345/838 |
| 2004/0133647 A1* | 7/2004 | Ozkan et al. | 709/206 |
| 2004/0261027 A1* | 12/2004 | Dillon et al. | 715/723 |
| 2007/0083596 A1* | 4/2007 | Ludwig et al. | 709/204 |
| 2007/0136438 A1* | 6/2007 | Brocke et al. | 709/217 |
| 2007/0162854 A1* | 7/2007 | Kikinis | 715/719 |
| 2007/0168543 A1* | 7/2007 | Krikorian et al. | 709/231 |
| 2007/0189709 A1* | 8/2007 | Ageishi et al. | 386/52 |
| 2007/0214417 A1* | 9/2007 | Toyama et al. | 715/723 |
| 2008/0028047 A1* | 1/2008 | Girouard et al. | 709/219 |
| 2008/0092047 A1* | 4/2008 | Fealkoff et al. | 715/716 |
| 2008/0129865 A1* | 6/2008 | Leonard | 348/468 |
| 2008/0184121 A1* | 7/2008 | Kulas | 715/723 |
| 2008/0301734 A1* | 12/2008 | Goldeen et al. | 725/44 |
| 2009/0094039 A1* | 4/2009 | MacDonald et al. | 705/1 |
| 2009/0271247 A1* | 10/2009 | Karelin et al. | 705/10 |
| 2010/0241971 A1* | 9/2010 | Zuber | 715/753 |

OTHER PUBLICATIONS

Hogg, Roman et al. Overview of Business Models for Web 2.0 Communities, Scientific Commons, 2006, pp. 1-17.*

Lange, Patricia G. "Commenting on Comments: Investigating Responses to Antagonism on YouTube," Society for Applied Anthropology Conference, Mar. 31, 2007, pp. 1-27.*

Kavanaugh, Andrea et al. "Community Networks: Where Offline Communities Meet Online," Journal of Computer-Mediated Communication, vol. 10, Issue 4, Jul. 2005, pp. 1-38.*

* cited by examiner

COLLABORATIVE EDITING IN A VIDEO EDITING SYSTEM

BACKGROUND

As the price of electronics decreases, many people now have access to various image and video capture devices. As these capture devices are more available, more people are capturing and editing images and video. Additionally, as users become more sophisticated with the capturing and editing of this data, the users desire to create more sophisticated effects with their captured data. In creating these effects, the user may utilize one or more local software applications to include transitions, credits, voice-overs, etc. into their video, audio and/or image data.

While the local software applications may provide users with various effects to include with captured images, audio and/or video, oftentimes, the local software applications may not provide the users with a direction for the most efficient or aesthetically pleasing effects to utilize. The users may be limited to the effects utilized by the local software applications and, thus, may be limited in the availability of other effects.

Additionally, users are generally not able to share video effects with other users. As the local software applications are generally not configured to upload and/or download additional video effects, the users may have no way of sharing their created video effects.

Thus, a need exists in the industry to address these deficiencies and inadequacies.

SUMMARY

Included are embodiments of a method for collaborative editing. At least one embodiment includes receiving an indication to include at least one media effect with at least one media segment and sending at least one media attribute associated with the at least one media segment to a remote server. Some embodiments include receiving data related to at least one determined media effect, the at least one determined media effect being determined from the at least one media attribute.

Also included are embodiments of a system for collaborative editing. At least one embodiment of a system includes a first receiving component configured to receive an indication to include at least one media effect with at least one media segment and a first sending component configured to send at least one media attribute associated with the at least one media segment to a remote server. Some embodiments include a second receiving component configured to receive data related to at least one determined media effect, the at least one determined media effect being determined from the at least one media attribute and a determining component configured to determine whether to apply the at least one received media attribute. Still some embodiments include a second sending component configured to, in response to determining not to apply the at least one received media attribute, send a request for at least one different media effect and a third receiving component configured to receive the at least one different media effect.

Additionally included are embodiments of a computer readable storage medium for collaborative editing. At least one embodiment of a computer readable storage medium includes first receiving logic configured to receive an indication to include at least one media effect with at least one media segment and first sending logic configured to send at least one media attribute associated with the at least one media segment to a remote server. Some embodiments include second receiving logic configured to receive data related to at least one determined media effect, the at least one determined media effect being determined from the at least one media attribute.

Other systems, methods, features, and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
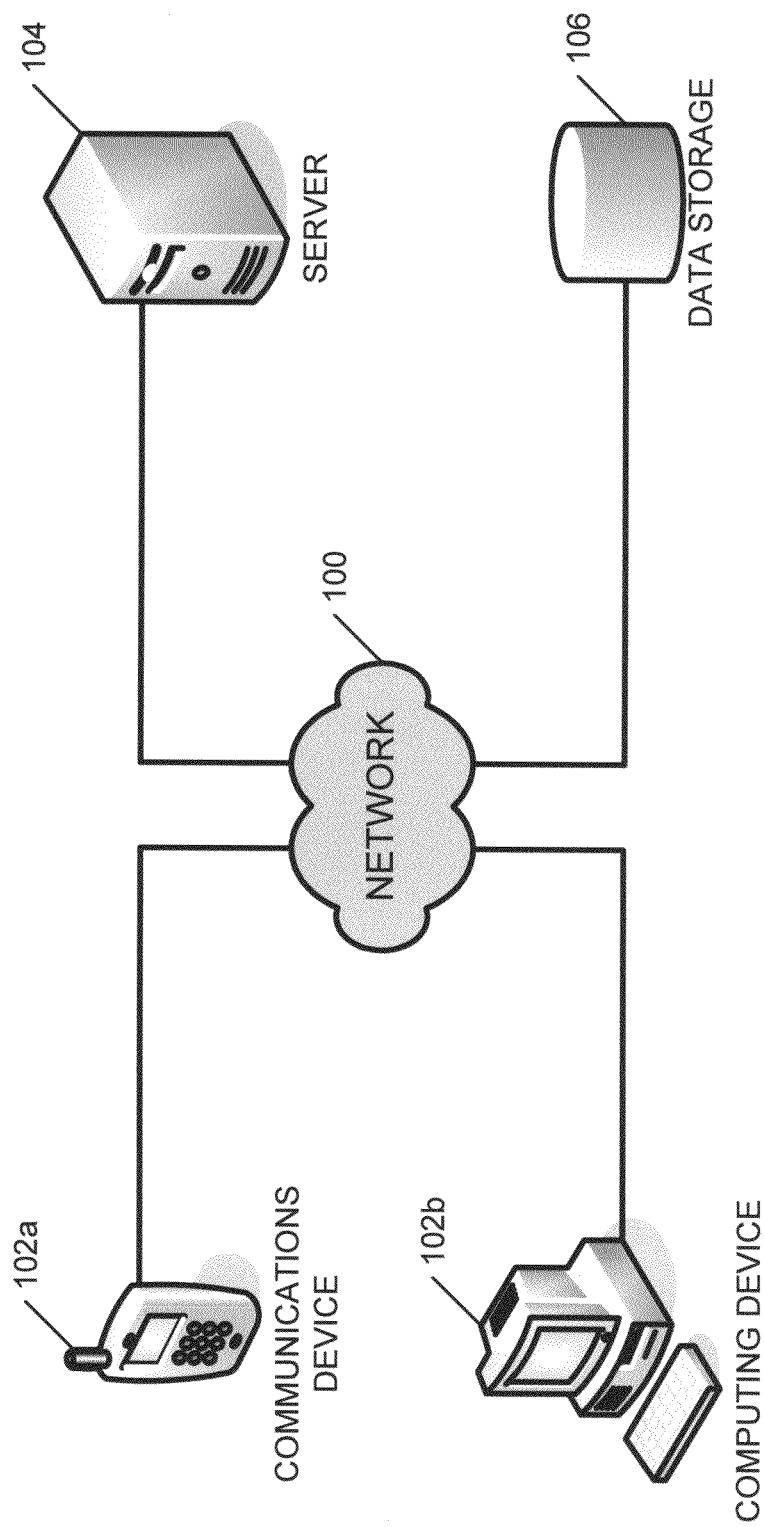
FIG. 1 is an exemplary embodiment of a network configuration for communicating data.

FIG. 1 is an exemplary embodiment of a network configuration for communicating data. As illustrated in the nonlimiting example of FIG. 1, a communications device 102a and a computing device 102b may be coupled to a network 100. More specifically, the network 100 may include a Public Switched Telephone Network (PSTN), a Mobile Telephone Network, the Internet, a Local Area Network, and/or other networks. Additionally, the communications device 102a and/or the computing device 102b may include a PSTN compatible communications device, a Mobile Telephone Network compatible device, an Internet compatible device, a digital image camera, a digital video camera and/or other devices.

Additionally coupled to the network 100 are a server 104 and a data storage component 106. Depending on the particular configuration, the server 104 may be configured to provide web page data, media data, and/or other types of data. Similarly, the data storage component 106, depending on the particular embodiment, may be configured to directly serve the communications device 102a, the computing device 102b, and/or the server 104.

In operation, a user may capture image and/or video data (which may or may not include audio data) via a capture device. The capture device may be a stand-alone device (such as a camera) that is not coupled to a network (such as the network 100), however this is not a requirement. Similarly, the communications device 102a and/or computing device 102b may also include logic to act as a capture device. The captured data may then be stored by the communications device 102a and/or the computing device 102b (collectively referred to as the device 102). If the capture device is a stand-alone device, the data may be downloaded to the device 102 and stored on a hard drive, in memory, etc. If the device 102 is operating at the capture device, the data may automatically be stored in the desired location.

Once the captured data is stored on the device 102, the user can execute one or more applications to edit the captured data. An editing application may be configured to provide transitions, music, voice-overs, credits, and/or other effects to customize the captured data. As indicated above, current video editing applications are simply local applications without interoperability with other local and/or remoter applications. However, at least one exemplary embodiment of the present disclosure may be configured to utilized logic and/or data from the server 104, the data storage component 106, other communications devices 102a and/or other computing devices 102b.

Figure 2:
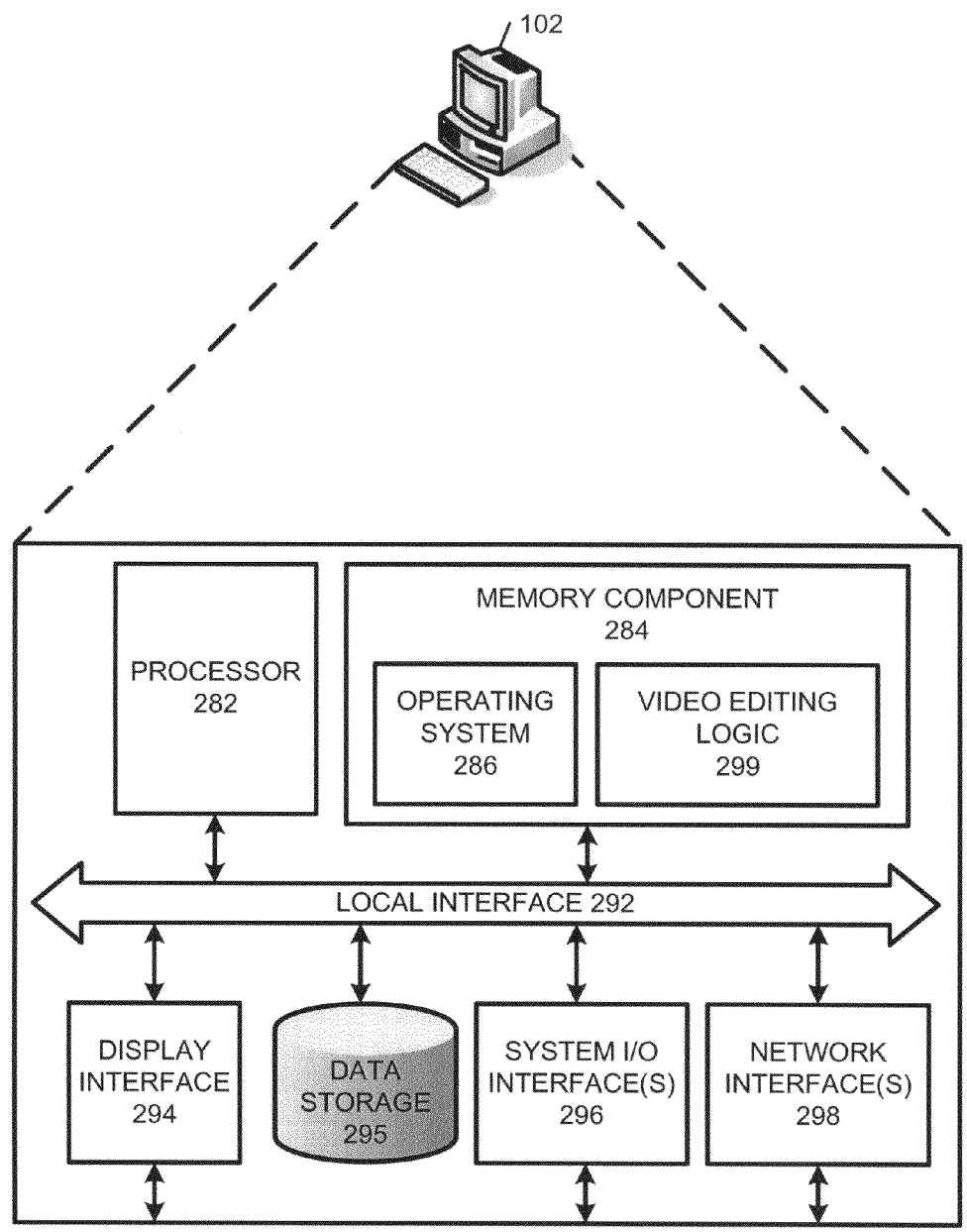
FIG. 2 is an exemplary embodiment of a computing device, such as the computing device from FIG. 1.

FIG. 2 is an exemplary embodiment of a device, such as the computing device 102b from FIG. 1. Although a wire-line user device is illustrated, this discussion can be applied to wireless devices, as well. According to exemplary embodiments, in terms of hardware architecture, as shown in FIG. 2, the device 102 (which may include the communications device 102a, the computing device 102b, and/or other devices) includes a processor 282, a memory component 284, a display interface 294, data storage 295, one or more input and/or output (I/O) device interface(s) 296, and/or one or more network interfaces 298 that are communicatively coupled via a local interface 292. The local interface 292 can include, for example but not limited to, one or more buses and/or other wired or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 282 may be a device for executing software, particularly software stored in the memory component 284. The processor 282 can include any custom made or commercially available processor, a central processing unit (CPU), an auxiliary processor among several processors associated with the device 102, a semiconductor based microprocessor (in the form of a microchip or chip set), a macroprocessor, and/or generally any device for executing software instructions.

The memory component 284 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory component 284 may incorporate electronic, magnetic, optical, and/or other types of storage media. One should note that the memory 284 can have a distributed architecture (where various components are situated remote from one another), but can be accessed by the processor 282.

The software in the memory 284 may include one or more separate programs, which may include an ordered listing of executable instructions for implementing logical functions. In the example of FIG. 2, the software in the memory component 284 may include video editing logic 299, as well as an operating system 286. The operating system 286 may be configured to control the execution of other computer programs and provide scheduling, input-output control, file and data management, memory management, and communication control and related services.

A system component and/or module embodied as software may also be construed as a source program, executable program (object code), script, and/or any other entity comprising a set of instructions to be performed. When constructed as a source program, the program is translated via a compiler, assembler, interpreter, or the like, which may or may not be included within the memory component 284, so as to operate properly in connection with the operating system 286.

The Input/Output devices that may be coupled to the system I/O Interface(s) 296 may include input devices, for example but not limited to, a keyboard, mouse, scanner, touch screen, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Additionally included are one or more of the network interfaces 298 for facilitating communication with one or more other devices. More specifically, network interface 298 may include any component configured to facilitate a connection with another device. While in some embodiments, among others, the device 102 can include the network interface 298 that includes a Personal Computer Memory Card International Association (PCMCIA) card (also abbreviated as "PC card") for receiving a wireless network card, this is a nonlimiting example. Other configurations can include the communications hardware within the device 102, such that a wireless network card is unnecessary for communicating wirelessly. Similarly, other embodiments include the network interfaces 298 for communicating via a wired connection. Such interfaces may be configured with Universal Serial Bus (USB) interfaces, serial ports, and/or other interfaces.

If the device 102 includes a personal computer, workstation, or the like, the software in the memory 284 may further include a basic input output system (BIOS) (omitted for simplicity). The BIOS is a set of software routines that initialize and test hardware at startup, start the operating system 286, and support the transfer of data among the hardware devices. The BIOS marble stored in ROM so that the BIOS can be executed when the device 102 is activated.

When the device 102 is in operation, the processor 282 may be configured to execute software stored within the memory 284, to communicate data to and from the memory 284, and to generally control operations of the device 102 pursuant to the software. Software in the memory 284, in whole or in part, may be read by the processor 282, perhaps buffered within the processor 282, and then executed.

One should note that while the description with respect to FIG. 2 includes the device 102 as a single component, this is a nonlimiting example. More specifically, in at least one embodiment, the device 102 can include a plurality of servers, personal computers, and/or other devices. Similarly, while the description of FIG. 2 describes the device 102, this is also a nonlimiting example, as other components may also be included in this description.

Additionally, while the video editing logic 299 is illustrated in FIG. 2 as each including a single software component, this is also a nonlimiting example. In at least one embodiment, video editing logic 299 may include one or more components, embodied in software, hardware, and/or firmware. As a nonlimiting example, the web browser logic 297 may include one or more modules for capturing, analyzing, and editing videos and/or images. Additionally, while the video editing logic 299 is depicted as residing on a single computing device, such as device 102, the video editing logic 299 may include one or more components residing on one or more different devices.

The embodiments disclosed herein can be implemented in hardware, software, firmware, or a combination thereof. At least one embodiment disclosed herein is implemented in software and/or firmware that is stored in a memory and executed by a suitable instruction execution system. If implemented in hardware, embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
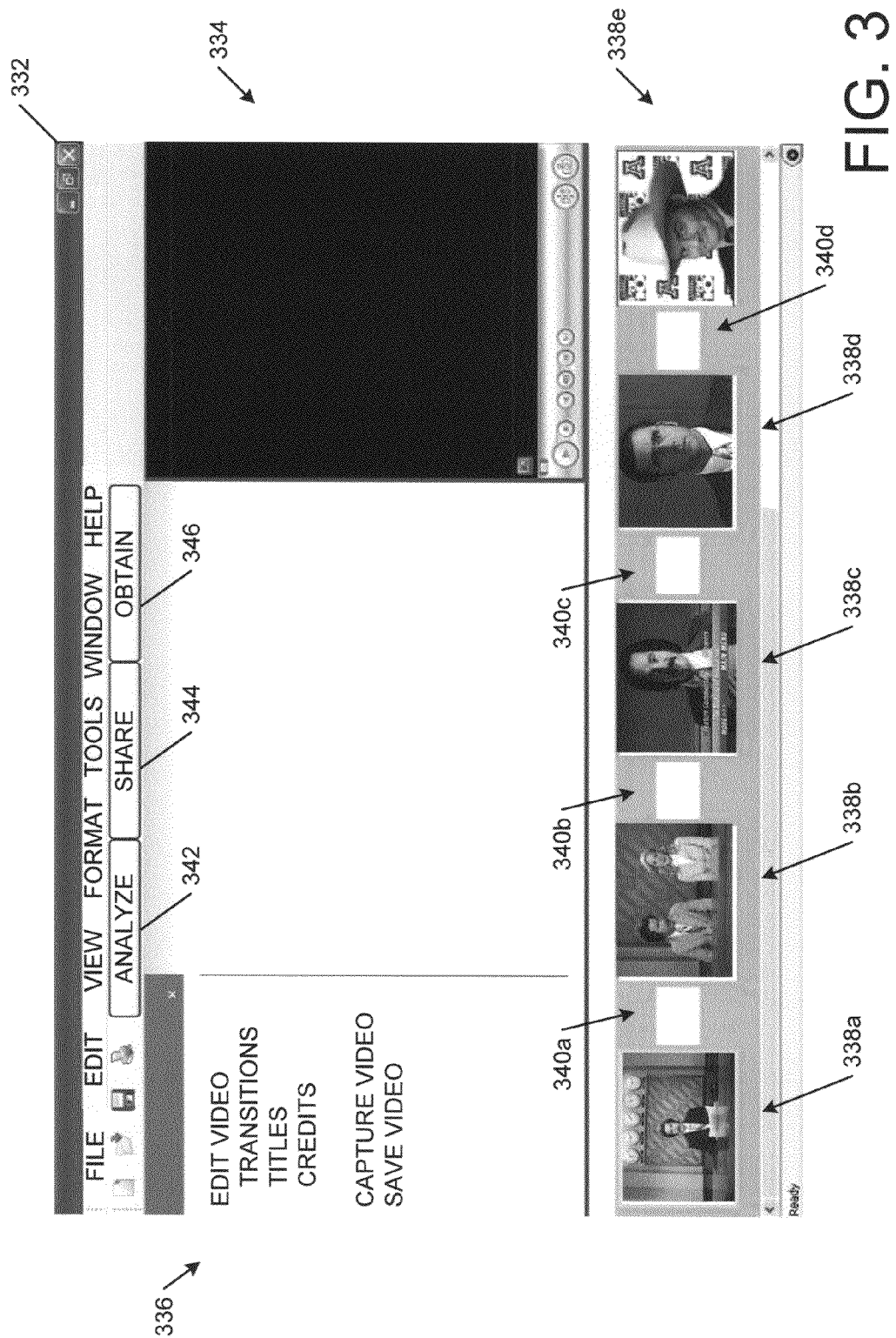
FIG. 3 is an exemplary embodiment of a user interface that may be provided to the user of the computing device from FIG. 2.

FIG. 3 is an exemplary embodiment of a user interface 332 that may be provided to the user of the computing device from FIG. 2. More specifically, as illustrated in the nonlimiting example of FIG. 3, the user interface 332 may be configured to access one or more video segments, image segments and/or audio segments. The media segments may be accessed via a local drive and/or from other locations. Upon accessing the segments, a thumbnail (and/or other information) associated with the segments may be displayed in display windows 338a-338e. Additionally, transition windows 340a-340d may be included to illustrate a selected transition between two segments.

Additionally included in the interface 332 is a display window 334. The display window 334 may be configured to record, play, rewind, fast forward, pause, and otherwise view and manipulate captured data. Similarly, a video editing menu 336 may be provided to include video transitions, effects, titles, credits, as well as other options. The video editing menu 336 may also include a capture video option and a save video option. An analyze option 342, a share option 344, and an obtain option 346 may also be provided by the interface 332. More specifically, the analyze option 342 may be configured to facilitate the analysis of captured data to determine desired effects to employ. The share option 344 may facilitate sharing of effects that the user has implemented for a particular video. The obtain option 346 may be selected to obtain effects from a remote source.

Figure 4:
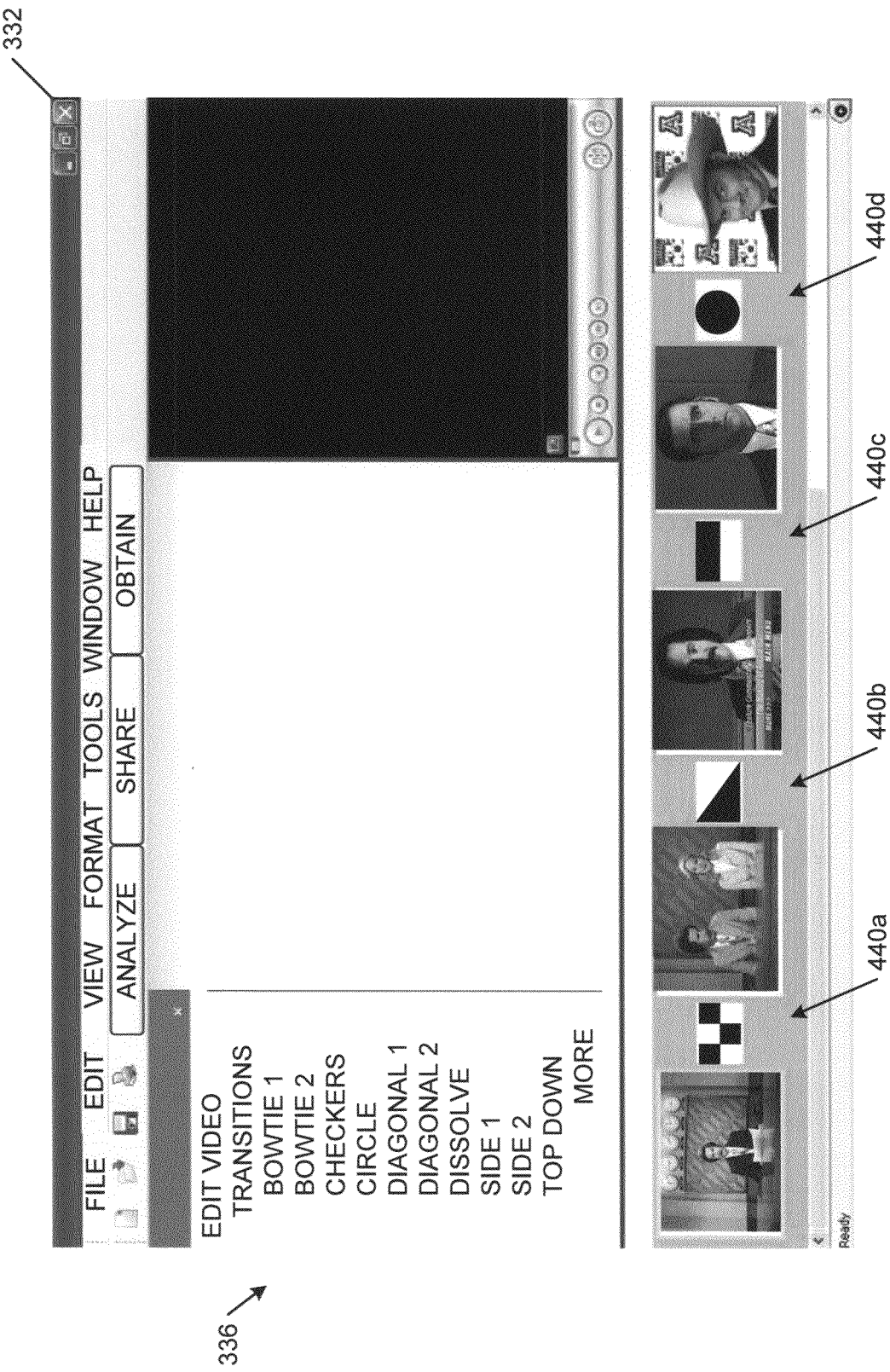
FIG. 4 is an exemplary embodiment of a user interface that may be configured to provide one or more image and/or video transitions, similar to the interface from FIG. 3.

FIG. 4 is an exemplary embodiment of a user interface 332 that may be configured to provide one or more image and/or video transitions, similar to the interface from FIG. 3. As illustrated in the nonlimiting example of FIG. 4, the user may select one or more effects, such as transitions, for the selected segments. As shown, between the first and second segments, the user has selected a checkers transition 440a. Between the second and third transitions, the user has selected a diagonal 1 transition 440b. Between the third and fourth segments, the user has selected a top down transition 440c. Between the fourth and fifth segments, the user has selected a circle transition 440d.

Figure 5:
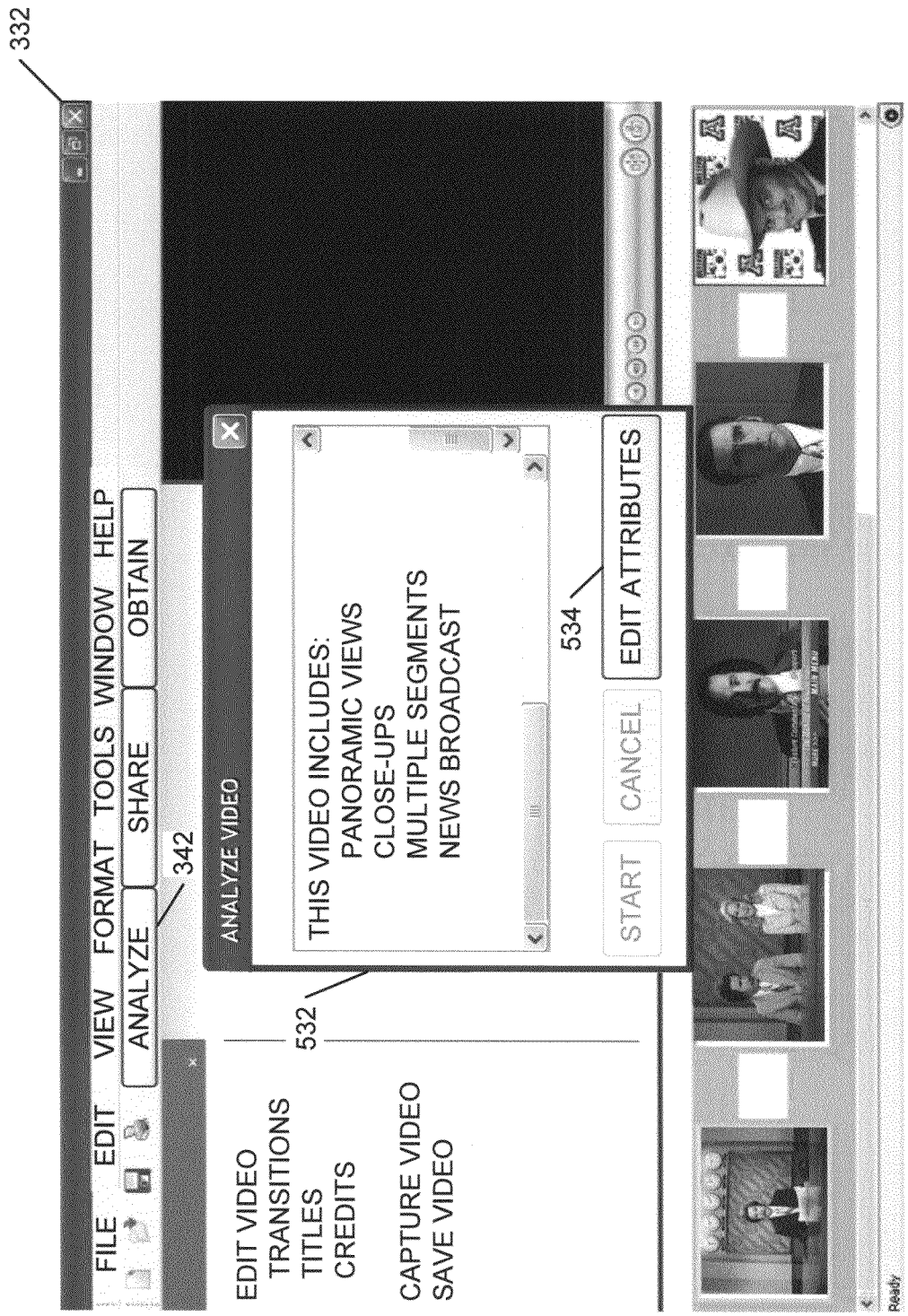
FIG. 5 is an exemplary embodiment of a user interface that may be configured to provide video analysis, similar to the interface from FIG. 4.

FIG. 5 is an exemplary embodiment of a user interface 332 that may be configured to provide video analysis, similar to the interface from FIG. 4. As illustrated in the nonlimiting example of FIG. 5, the user interface 332 may provide the analyze option 342, as discussed above. More specifically, in response to selecting the analyze option 342, the video editing logic 299 (which may be located locally and/or remotely), may analyze various aspects of the present video to determine one or more attributes of the video. As a nonlimiting example, the selected video segments may relate to a newscast. In analyzing the video, the video editing logic 299 can determine the lighting of the video segments, the number of close-ups, the movement of the camera, the overlaid imagery on the video, metadata associated with the video, and/or other aspects of the video to determine the one or more attributes. An analyze video window 532 may then be displayed that includes the determined video attributes. Also included with the analyze video window 532 is an edit attributes option 534. The edit attributes option 534 may provide the user with the ability to edit, add, and/or remove determined video attributes.

Figure 6:
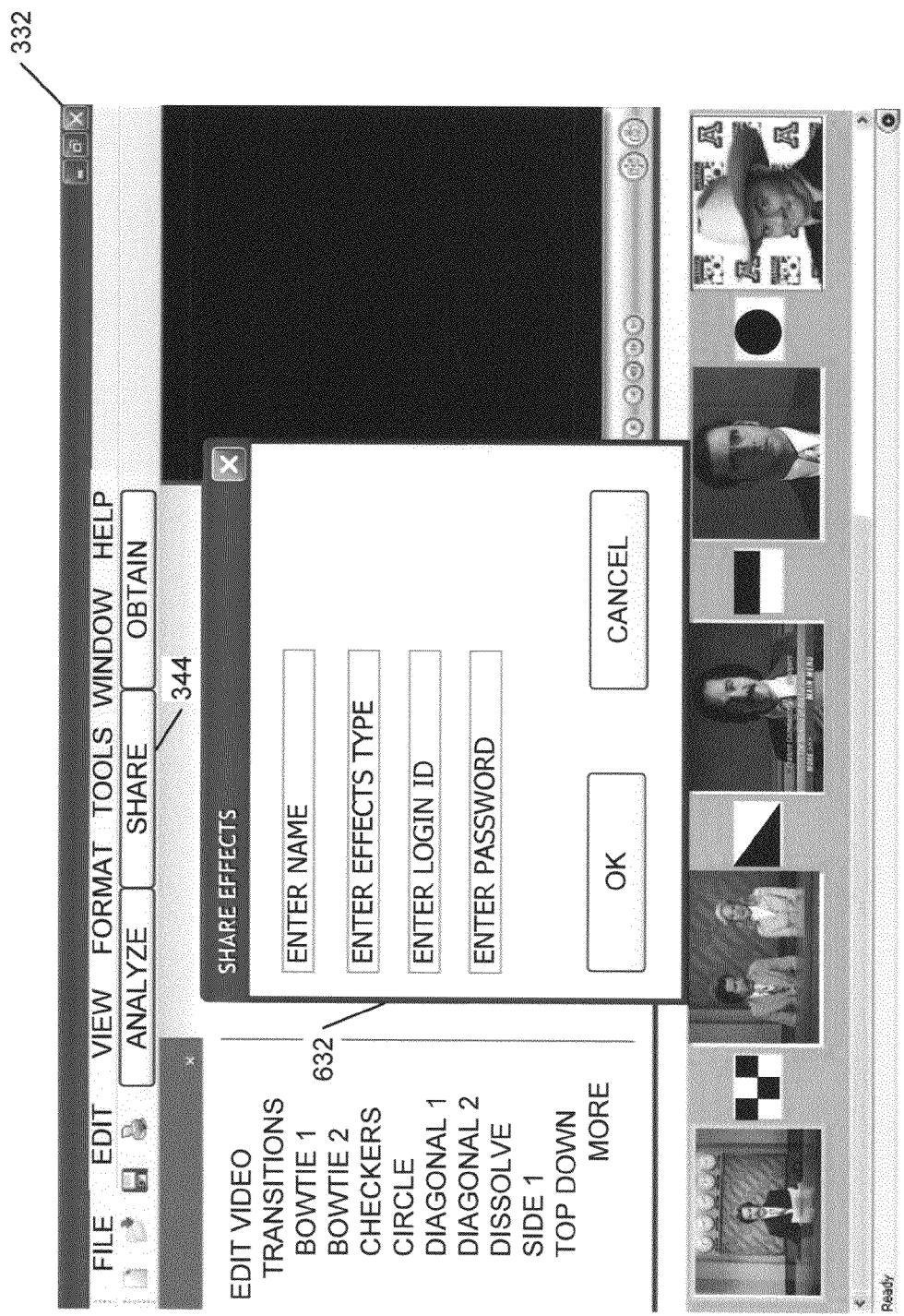
FIG. 6 is an exemplary embodiment of a user interface that may be configured to share effects, similar to the interface from FIG. 5.

FIG. 6 is an exemplary embodiment of a user interface 332 that may be configured to share effects, similar to the interface from FIG. 5. As illustrated in the nonlimiting example of FIG. 6, in response to selection of the share option 344, a share effects window 632 may be displayed. More specifically, the share effects window 632 may provide the user with the ability to share effects that have been utilized for the current video. The video editing logic 299 may be configured to determine the effects utilized and, in at least one exemplary embodiment, at least one attribute associated with the video. The user may also input the name of the shared effects, the type of effects, as well as a login identification and password. Upon submitting the effects, data may be sent to the network 100 for storage at the server 104, the data storage component 106, and/or elsewhere.

Figure 7:
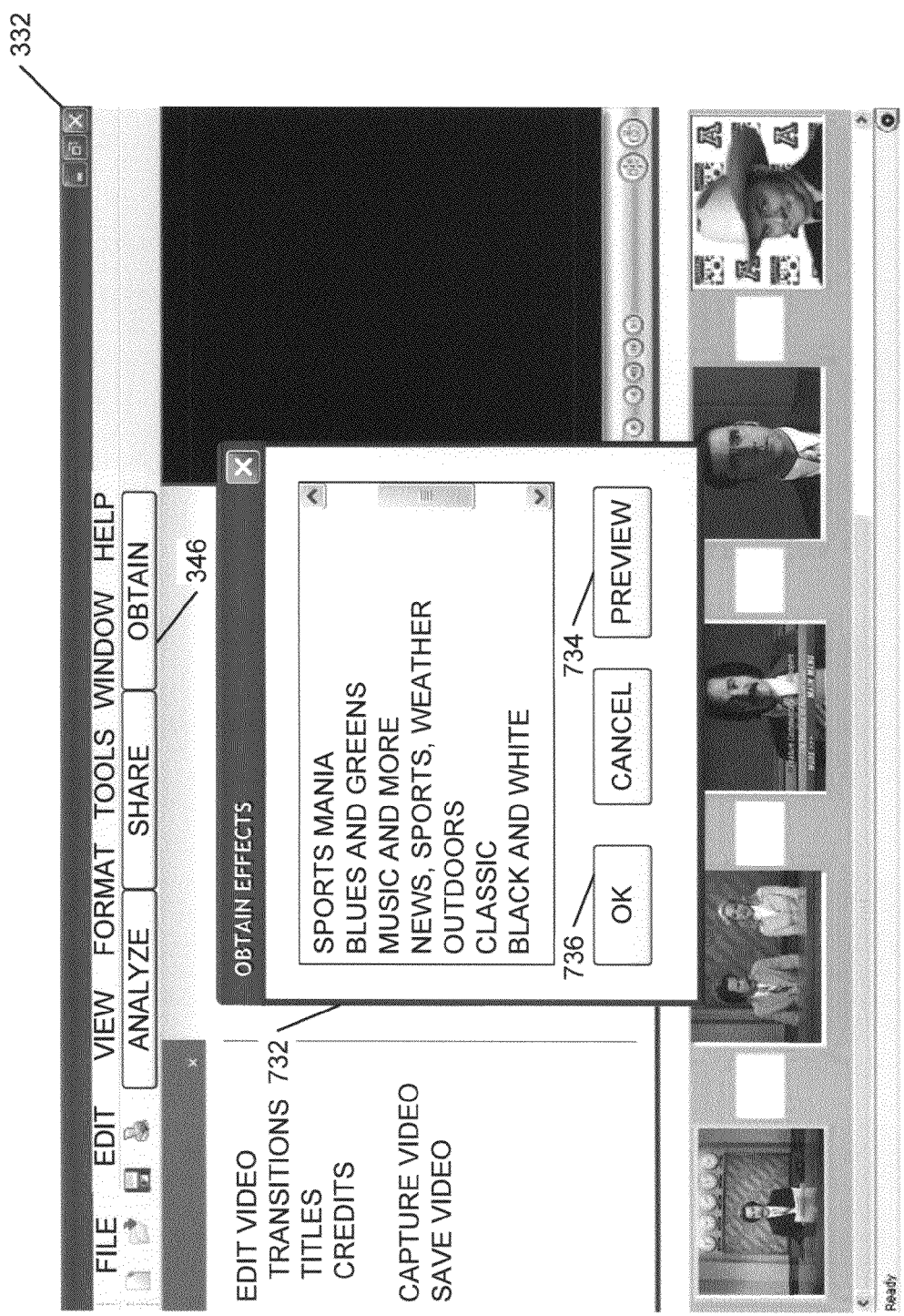
FIG. 7 is an exemplary embodiment of a user interface that may be configured to obtain effects, similar to the interface from FIG. 6.

FIG. 7 is an exemplary embodiment of a user interface 332 that may be configured to obtain effects, similar to the interface from FIG. 6. As illustrated in the nonlimiting example of FIG. 7, the user may select the obtain option 346, which may facilitate presentation of an obtain effects window 732. The obtain effects window 732 may be configured to provide one or more effects packages, (templates) for utilization of on the present video segments. As a nonlimiting example, upon selection of the obtain option 346, the video editing logic 299 may be configured to access the server 104 to retrieve one or more video effects packages. The one or more video effects packages may be selected based on user preferences, video attributes, and/or other criteria. A list of the retrieved video effects packages may be presented to the user in the obtain effects window 732.

Similarly, in at least one exemplary embodiment, the one or more video packages may be located locally. The video editing logic 299 may be configured to access the one or more video packages and provide a list of the available packages in the obtain effects window 732. The video editing logic may receive the available video packages via a user selection at a web interface, prior to editing the current video segments, however this is not a requirement.

Additionally, in at least one exemplary embodiment, the video editing logic 299 may be configured to periodically access the server 104 to determine whether there are any video packages that are available (and/or any changes to an existing list of available video effects packages). If there is at least one available video effects package, the video editing logic 299 can store data related to the available package, to be downloaded, when selected for use by the user.

Also included in the obtain effects window 732 is a preview option 734. The preview option 734 may be configured to present, to the user, one or more of the video effects in a preview fashion. As a nonlimiting example, by selecting one (or more) of the listed effects packages and the preview option 732, the effects package may be presented on the video segments selected and/or on a predetermined video. If the user decides to apply the selected video effects package to the current video segments, the user can select the OK option 736. The selected effects package can then, depending on the particular configuration, be applied to the current video segments and/or stored locally.

Figure 8:
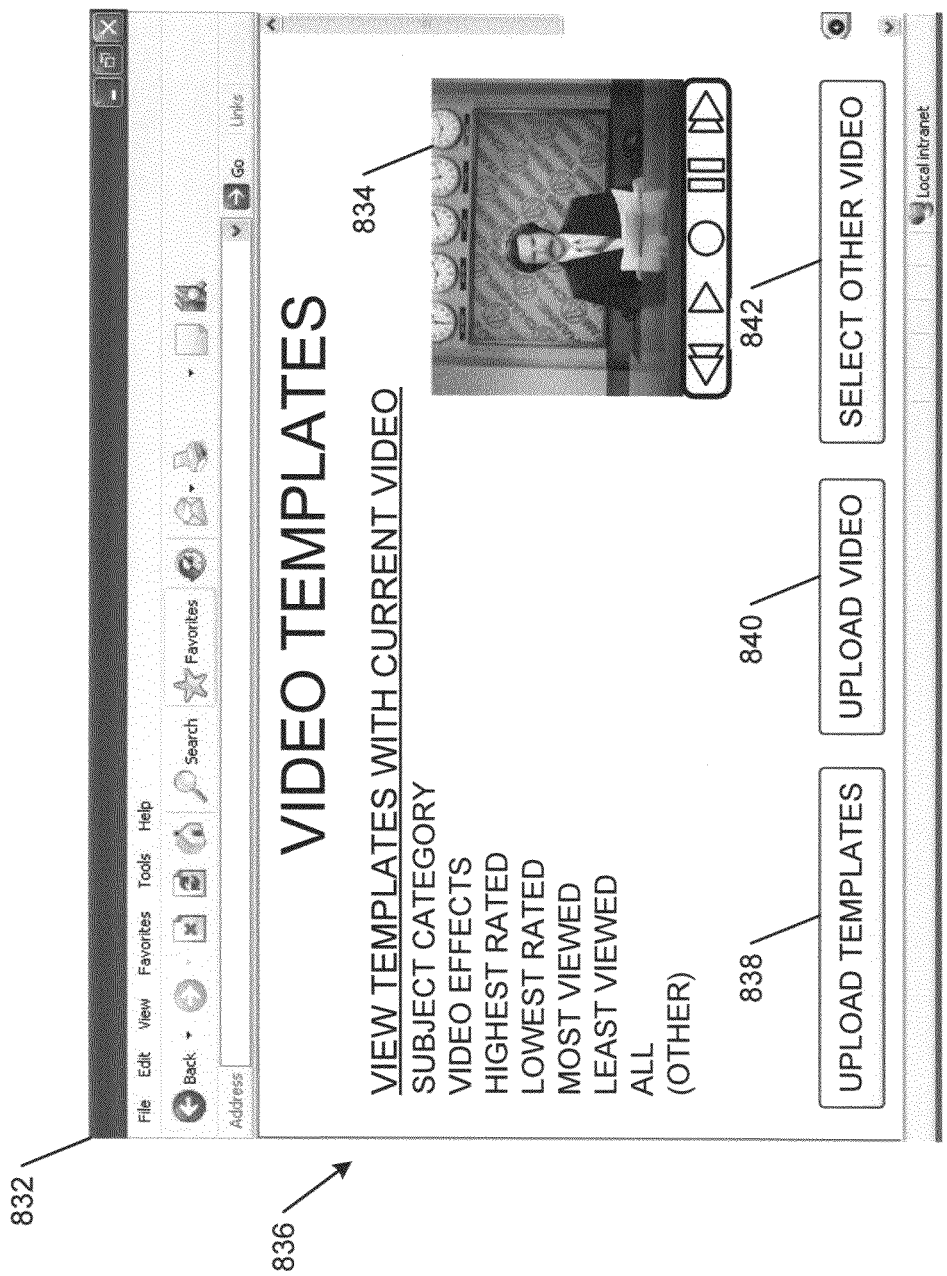
FIG. 8 is an exemplary embodiment of a web interface that may be configured to provide video templates, such as in the network from FIG. 1.

FIG. 8 is an exemplary embodiment of a web interface 832 that may be configured to provide video templates, such as in the network from FIG. 1. As illustrated in the nonlimiting example of FIG. 8, the web interface 832 may be provided to a user for accessing a plurality of video editing options. More specifically, the web interface 832 may include a video section 834. The video section 834 may be configured to display one or more videos that are stored at the server 104 and/or videos stored locally at a communications device 102a and/or computing device 102b. The video section 834 may also be configured to provide trick mode functionality including options such as play, stop, pause, fast forward, and rewind.

Also included in the nonlimiting example of FIG. 8 is a templates menu 836. The templates menu 836 may include one or more video effects templates options, organized into categories. As illustrated, the templates may be organized according to subject matter of the video, effects used in the template, user rating, most viewed, least viewed, and/or via other criteria. Additionally, the web interface 832 may include an upload templates option 838 to allow a user to upload a created template to be available via the web interface 832.

Similarly, the web interface 832 also includes an upload video option 840. The upload video option 840 may be configured to allow a user to upload a video to determine desired video effects to apply to the uploaded video. More specifically, upon selecting the upload video option 840, the user can select one or more video segments to upload. The video segments may be arranged by the user and displayed in the video section 834. The user can also select a desired video effects template to apply to the video, as discussed in more detail, below.

Figure 9:
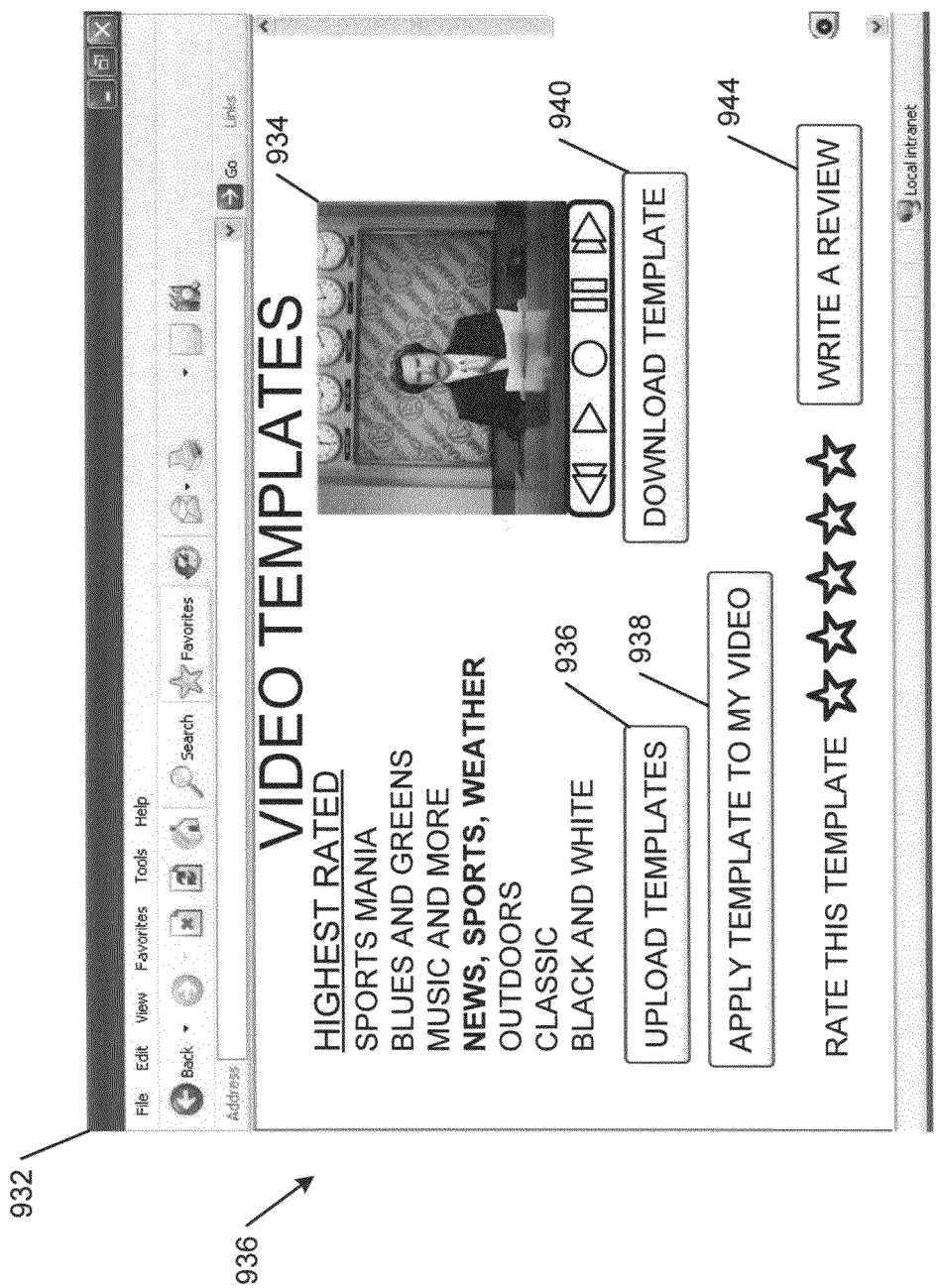
FIG. 9 is an exemplary embodiment of a web interface that may be configured to provide one or more options for video templates, similar to the interface from FIG. 8.

FIG. 9 is an exemplary embodiment of a web interface 932 that may be configured to provide one or more options for video templates, similar to the interface from FIG. 8. As illustrated in the nonlimiting example of FIG. 9, included with the web interface 932 is a highest rated menu for selecting a video effects template from the highest rated templates. By selecting the one or more of the templates, the video effects associated with the selected template may be applied to the at least one video segments for display in video section 934. If the user desires to download a template, the user can select a download template option 940. Similarly, if the user has previously applied a configuration of effects to a video, image, and/or audio, the user can select an upload templates option 936.

In at least one exemplary embodiment, the upload templates option 936 can facilitate uploading of a template created by a user. Similarly, in some embodiments, the upload templates option 936 may be configured to determine effects that have previously been applied to a video. From the determined effects, the video effects logic 299 can then create and upload an effects template with the determined effects. Regardless, upon selecting the upload templates option 936, the user can select the desired data for upload. That data can then be uploaded for display and use by the server 104.

Additionally included in the web interface 938 is an apply template to my video option 938. The apply template to my video option 938 can provide the user with the ability to upload media segments (audio, video, and/or image segments) and apply a selected template to those segments. One should note that an effects template might include one or more effects to apply to media segments. Additionally, the effects template may also include analysis logic for determining where to apply the desired effects. As the media segments may vary from user to user and media to media, the video templates may have logic to dynamically apply the desired effects. Additionally, once an effects template is applied to the media segments, an option (not shown) may be provided to a user (similar to the options shown in FIG. 4) to alter the effects that have been applied from the template.

The web interface 932 can also provide the user with a ratings option to rate the selected template and/or a review option 944 write a review for the template. As users view and apply the video templates, the users can rate the templates according to any number of factors. As the server 104 receives the ratings and reviews associated with the templates, the server can sort and display the most (or least) popular templates. Similarly, while some embodiments may utilize an express ratings system, other configurations may rate templates based on the number of times a user views the template, the number of times the template is downloaded, and/or other criteria.

Figure 10:
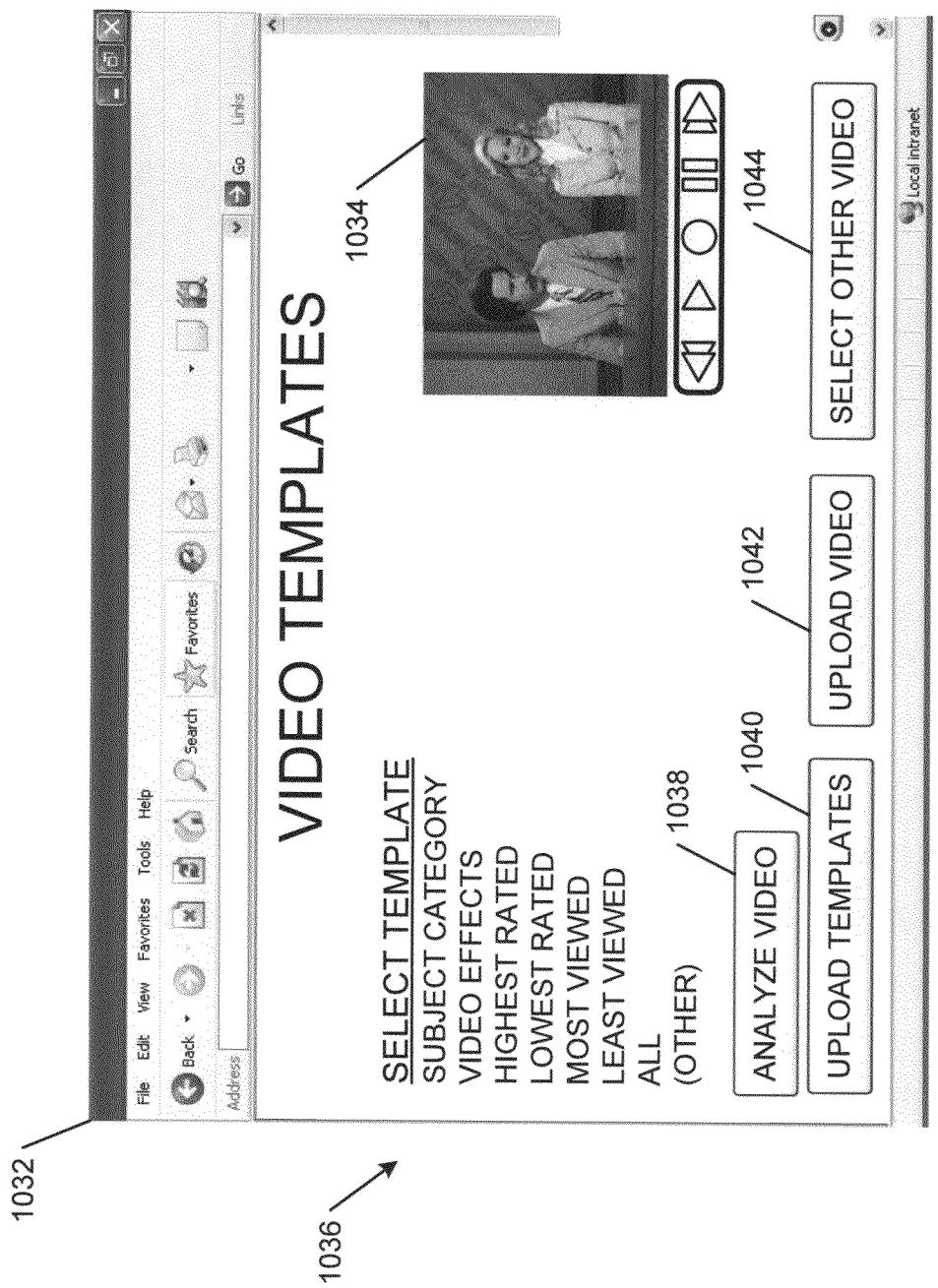
FIG. 10 is an exemplary embodiment of a web interface that may be configured to provide an analysis option for a video, similar to the interface from FIG. 9.

FIG. 10 is an exemplary embodiment of a web interface 1032 that may be configured to provide an analysis option for a video, similar to the interface from FIG. 9. As illustrated in the nonlimiting example of FIG. 10, the web interface 1032 may include a template menu 1036 for selecting one or more effects templates. Also included is an upload templates option 1040 and a select other video option 1044. The select other video option can provide a user with the ability to choose one or more other videos stored by the server 104. By selecting the select other video option 1044, the user can view templates as applied to different videos.

Also included is an upload video option 1042. The upload video option 1042 may provide the user with the ability to upload a video to the server 104. Additionally included is an analyze video option 1038. The analyze video option 1038 may be configured to analyze an uploaded (or otherwise selected) video to determine one or more templates to apply to the video.

Figure 11:
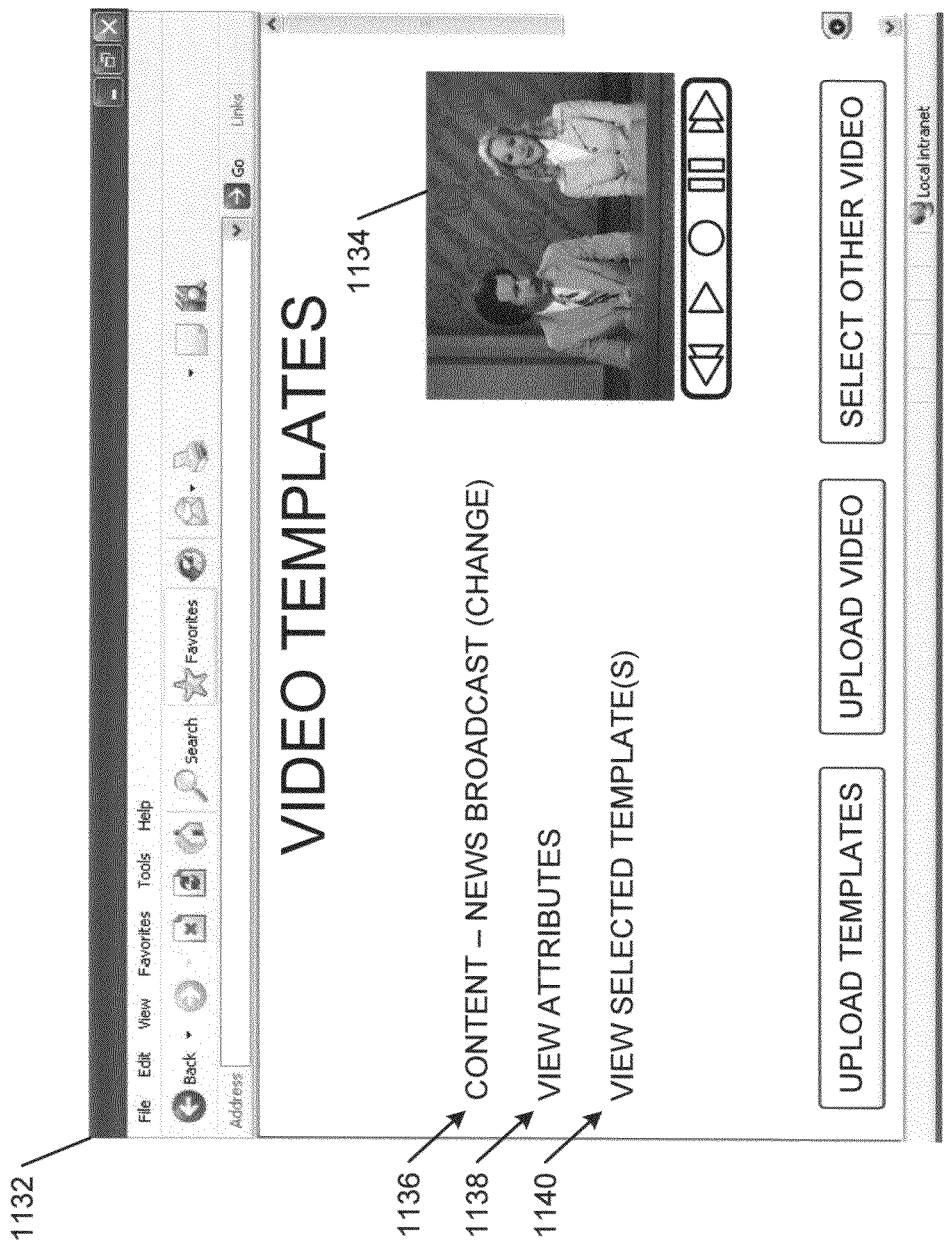
FIG. 11 is an exemplary embodiment of a web interface that may be configured to provide view attributes of an analyzed video, similar to the interface from FIG. 10.

FIG. 11 is an exemplary embodiment of a web interface 1132 that may be configured to provide view attributes of an analyzed video, similar to the interface from FIG. 10. As illustrated in the nonlimiting example of FIG. 11, the web interface 1132 includes content option 1136, a view attributes option 1138, and a view selected template(s) option 1140. More specifically, in at least one exemplary embodiment the content option 1136 may be configured to display the determined content of the current video, based on an analysis of at least one attribute of the video. Additionally, by selecting the content option 1136, the user can change the designation that has been determined and currently displayed, as described in more detail, below. Similarly, by selecting the view attributes option 1138, the user can view attributes determined (and/or selected) for the current video. By selecting the view selected template(s) option 1140, the user can view templates that have been determined as candidates to apply to the current video.

Figure 12:
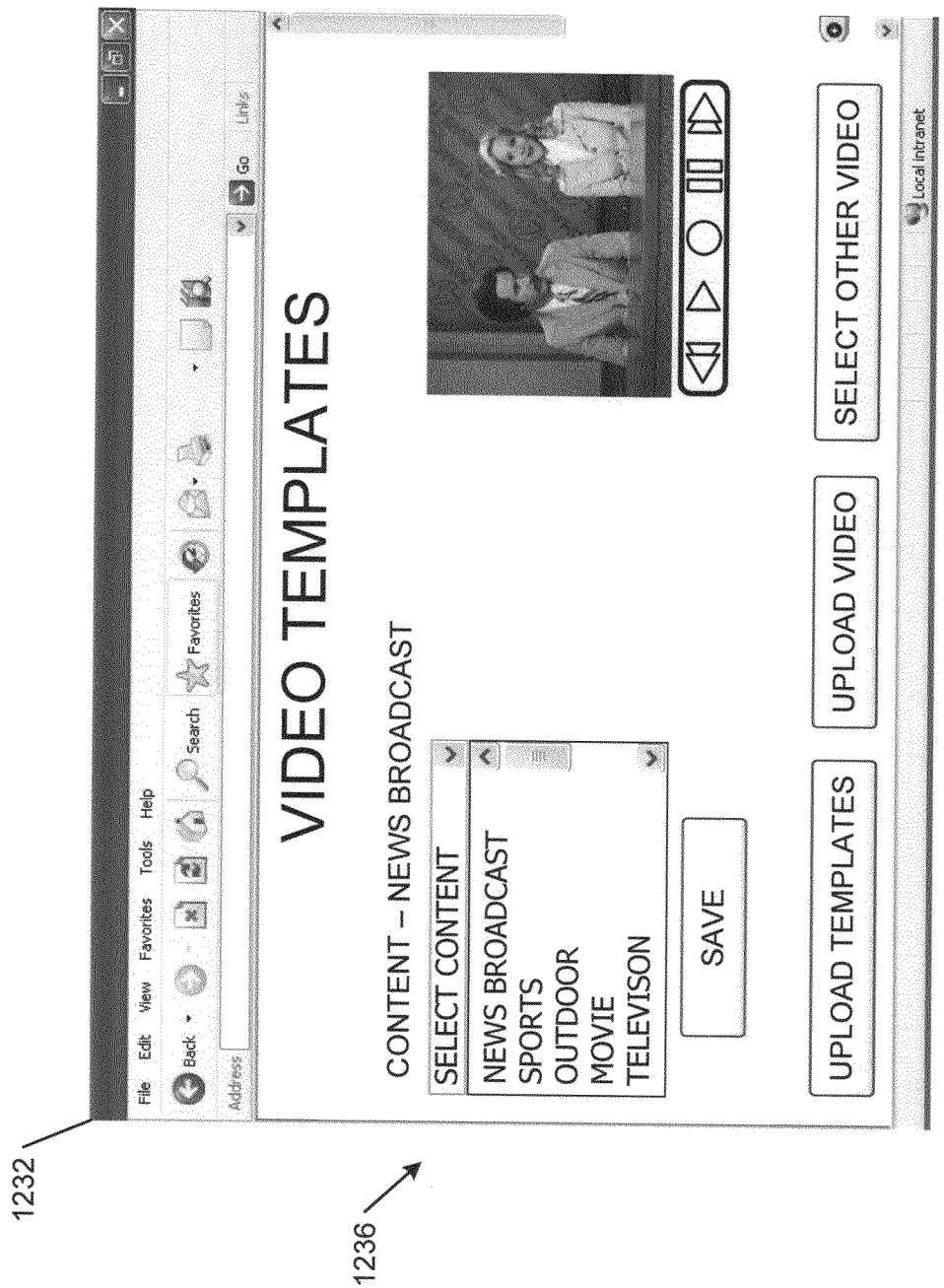
FIG. 12 is an exemplary embodiment of a web interface that may be configured to provide one or more video templates according to determined video attributes, similar to the interface from FIG. 11.

FIG. 12 is an exemplary embodiment of a web interface 1232 that may be configured to provide one or more video templates according to determined video attributes, similar to the interface from FIG. 11. As illustrated in the nonlimiting example of FIG. 12, web interface 1232 may be accessed by selecting the content option 1136. More specifically, interface 1232 may include a content menu 1236 for selecting a different content type for the current video. Also included are other options for uploading and selecting video and templates.

Figure 13:
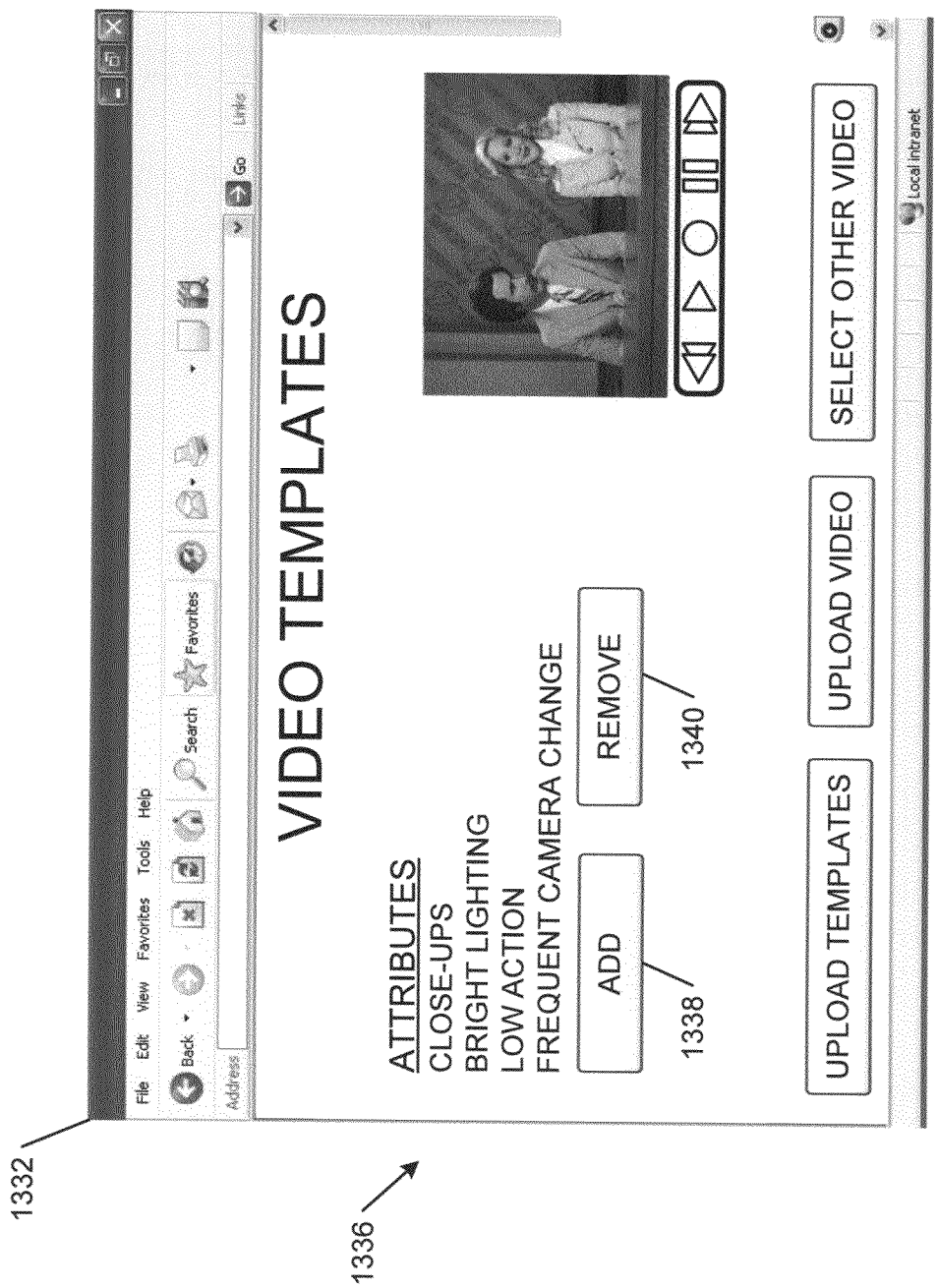
FIG. 13 is an exemplary embodiment of a web interface that may be configured to provide one or more options related to determined video attributes, similar to the interface from FIG. 11.

FIG. 13 is an exemplary embodiment of a web interface 1332 that may be configured to provide one or more options related to determined video attributes, similar to the interface from FIG. 11. As illustrated, the nonlimiting example of FIG. 13 may be accessed by selection of the view attributes option 1138, from FIG. 11. More specifically, interface 1332 includes an attributes menu 1336, which may be configured to display one or more of the determined attributes of the current video. An add option 1338 may also be included to add additional attributes. As shown in FIG. 13, these attributes include panoramic views, multiple segments, and news broadcast. A remove option 1340 may be included to remove one or more of the determined attributes.

Figure 14:
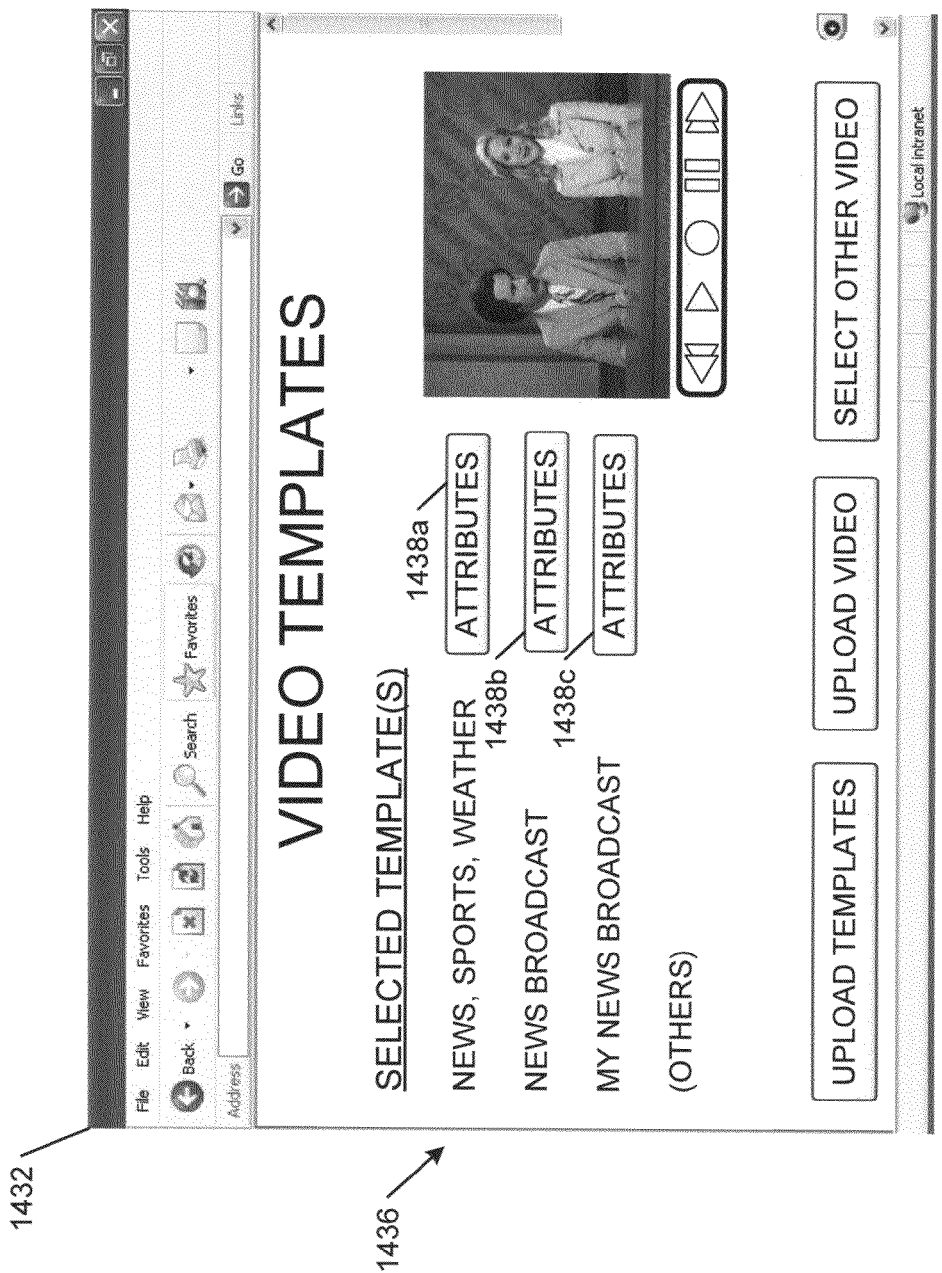
FIG. 14 is an exemplary embodiment of a web interface that may be configured to view one or more video templates selected for an analyzed video, similar to the interface from FIG. 13.

FIG. 14 is an exemplary embodiment of a web interface 1432 that may be configured to view one or more video templates selected for an analyzed video, similar to the interface from FIG. 13. As illustrated in the nonlimiting example of FIG. 14, the web interface 1432 may be displayed in response to selection of the view selected template(s) option 1140, from FIG. 11. Included with the interface 1432 is a selected template(s) menu 1436 displaying are one or more templates that have been determined to potentially apply to the selected video. Additionally, attributes options 1438a-1438c may be selected to view attributes that may be used to select the corresponding template.

Figure 15:
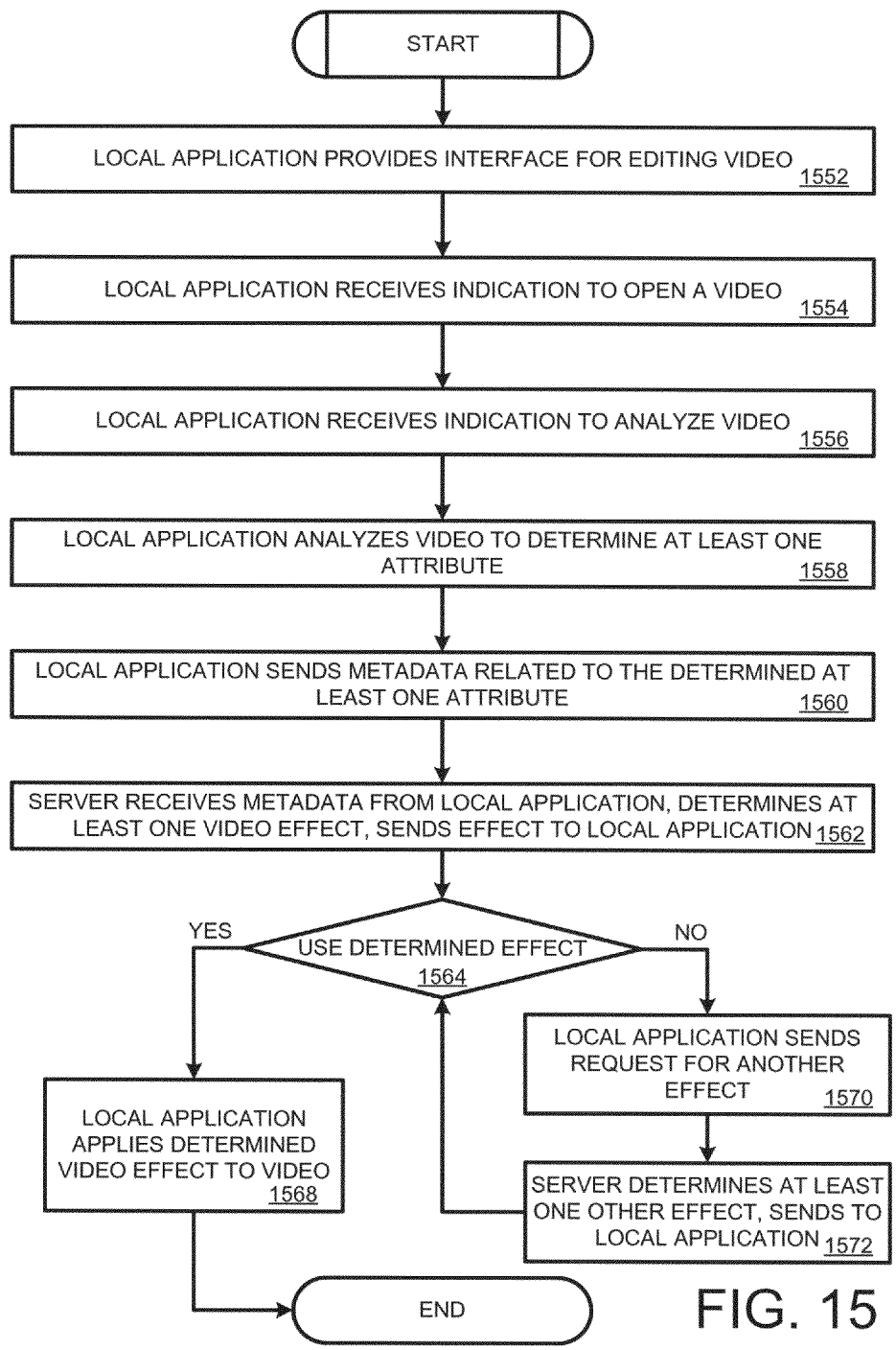
FIG. 15 is an exemplary embodiment of a process that may be utilized for applying a determined video effect to a video, similar to the process from FIG. 14.

FIG. 15 is an exemplary embodiment of a process that may be utilized for applying a determined video effect to a video, similar to the process from FIG. 14. As illustrated in the nonlimiting example of FIG. 15, the local application can provide an interface for editing video (block 1552). The local application can receive an indication to open a video (block 1554). The local application can receive an indication to analyze the video (block 1556). The local application analyzes the video to determine at least one attribute of the video (block 1558). The local application can then send metadata related to the determined attribute to the server 104 (block 1560). The server 104 can receive the metadata from the local application and can determine at least one video effect, based on the received metadata. The local server can then send the desired at least one effect to the local application (block 1562).

A determination can then be made whether to use the determined effect or not (block 1564) and this determination can be sent back to the server. This information can be used as feedback to the database server. Thus, the server can gather statistics and predict a desired effect request for the next time. If a determination is made to not use the determined effect, the local application can send a request for another effect to the server (block 1570). The server 104 can then determine at least one other effect and send the at least one other effect to the local application (block 1572). If, on the other hand, a determination is made to use the determined effect, the local application can apply the determined effect to the current video (block 1568).

Figure 16:
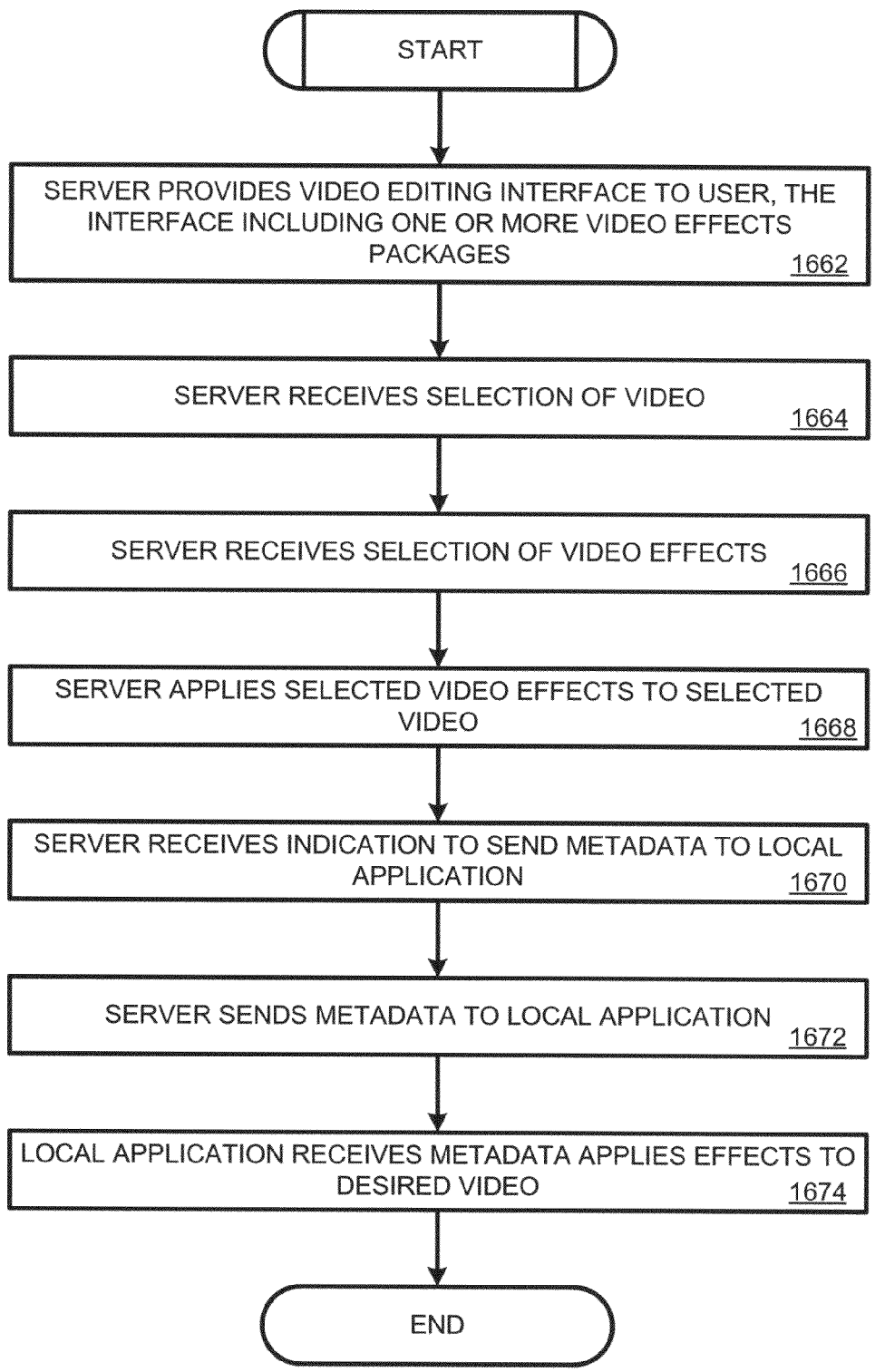
FIG. 16 is an exemplary embodiment of a process that may be utilized for receiving metadata associated with a video, similar to the process from FIG. 15.

FIG. 16 is an exemplary embodiment of a process that may be utilized for receiving metadata associated with a video, similar to the process from FIG. 15. As illustrated in the nonlimiting example of FIG. 16, the server 104 can provide a video-editing interface to a user. The interface may include one or more video effects packages (block 1662). The server 104 can then receive selection of a video (block 1664). The server 104 can apply the selected video effects to the selected video (block 1668). The server 104 can receive an indication to send metadata associated with the selected effects to a local application (block 1670). The server 104 can then send the metadata to the local application (block 1672). The local application can receive the metadata and apply the effects to a desired video (block 1674).

Figure 17:
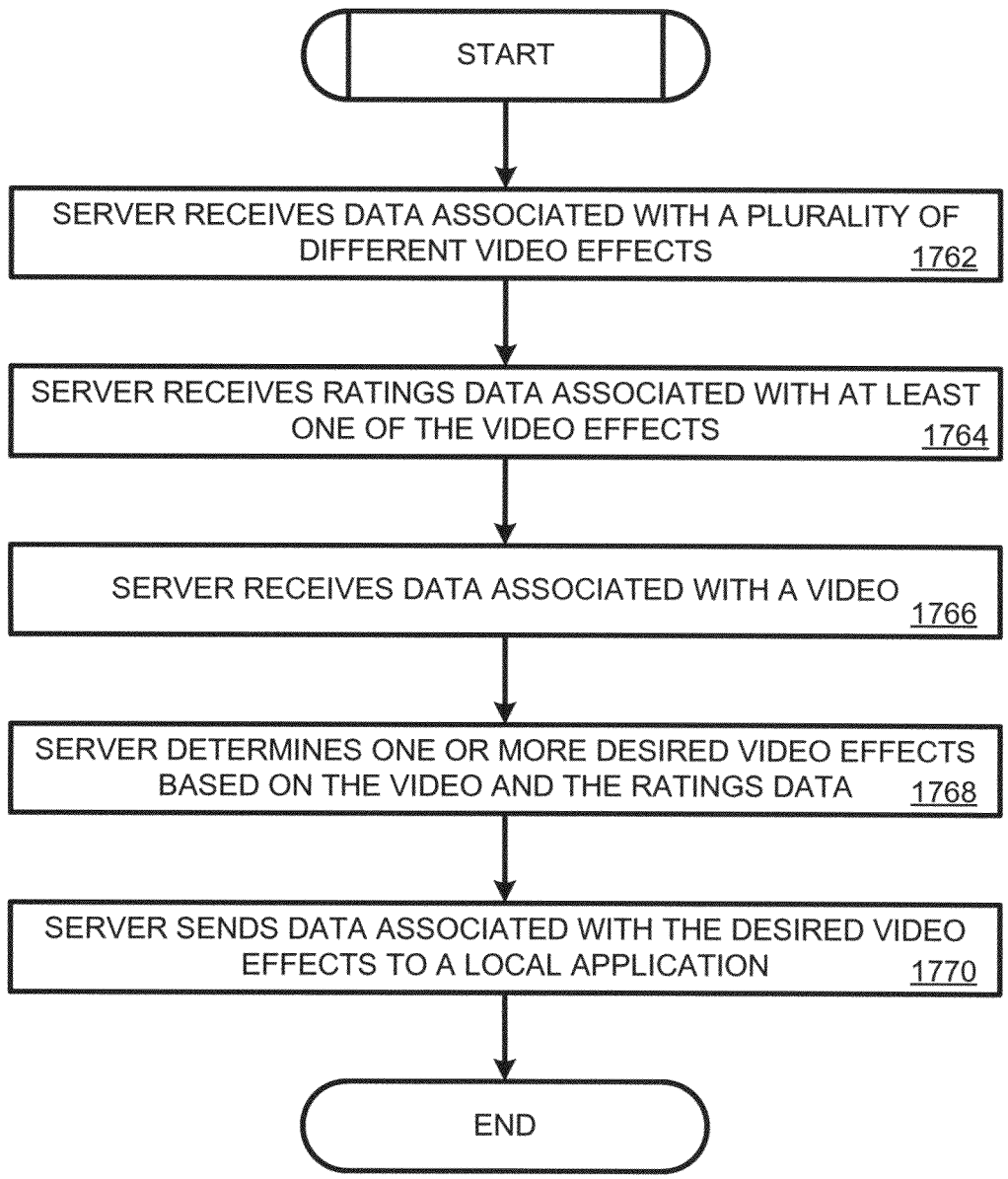
FIG. 17 is an exemplary embodiment of a process that may be utilized for sending data to a local application, similar to the process from FIG. 16.

FIG. 17 is an exemplary embodiment of a process that may be utilized for sending data to a local application, similar to the process from FIG. 16. As illustrated in the nonlimiting example of FIG. 17, the server 104 can receive data associated with a plurality of different video effects (block 1762). The data can include video attributes for determining the desired video effect based on the attributes and the rating data. The attributes (e.g., syntax, context data) can include information related to time, brightness, semantic, etc. The server 104 can then receive ratings data associated with at least one of the video effects (block 1764). The server 104 receives data associated with a video (block 166). The server 104 can then determine one or more desired video effects based on the video and the ratings data (block 1768). The server 104 can then send data associated with the desired video effects to a local application (block 1770).

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A system for collaborative editing, comprising:
    a first receiving component configured to receive an indication to include at least one media effect with at least one media segment;
    a first sending component configured to send at least one media attribute associated with the at least one media segment to a remote server, wherein the media attribute is syntax or context data including information related to time, brightness or semantic;
    a second receiving component configured to receive data related to the at least one determined media effect, the at least one determined media effect being determined from the at least one media attribute and rating data, wherein the rating data is provided by a plurality of users performing collaborative editing;
    a determining component configured to determine whether to apply the at least one received media attribute;
    a second sending component configured to, in response to determining not to apply the at least one received media attribute, send a request for at least one different media effect; and
    a third receiving component configured to receive the at least one different media effect.

2. The system of claim 1, further comprising, a first applying component configured to, in response to determining to apply the at least one received media attribute, apply the received at least one determined media effect to the at least one media segment.

3. The system of claim 1, further comprising an analyzing component configured to analyze the at least one media segment to determine the at least one media attribute.

4. The system of claim 1, wherein the at least one media segment includes at least one of the following: audio, image, and video.

5. The system of claim 1, further comprising a second applying component configured to apply the at least one different media effect.

6. A method for collaborative editing, comprising:
    receiving an indication to include at least one media effect with at least one media segment;
    sending at least one media attribute associated with the at least one media segment to a remote server, wherein the media attribute is syntax or context data including information related to time, brightness or semantic; and
    receiving data related to at least one determined media effect, the at least one determined media effect being determined from the at least one media attribute and rating data, wherein the rating data is provided by a plurality of users performing collaborative editing.

7. The method of claim 6, further comprising, applying the received at least one determined media effect to the at least one media segment.

8. The method of claim 6, further comprising analyzing the at least one media segment to determine the at least one media attribute.

9. The method of claim 6, wherein the at least one media segment includes at least one of the following: audio, image, and video.

10. The method of claim 6, further comprising:
    determining not to apply the at least one received media attribute;
    sending a request for at least one different media effect; and
    receiving the at least one different media effect.

11. The method of claim 10, further comprising applying the at least one different media effect.

12. A computer readable storage medium for collaborative editing, comprising:
    first receiving logic configured to receive an indication to include at least one media effect with at least one media segment;
    first sending logic configured to send at least one media attribute associated with the at least one media segment to a remote server, wherein the media attribute is syntax or context data including information related to time, brightness or semantic; and second receiving logic configured to receive data related to at least one determined media effect, the at least one determined media effect being determined from the at least one media attribute and rating data, wherein the rating data is provided by a plurality of users performing collaborative editing.

13. The computer readable storage medium of claim 12, further comprising first applying logic configured to apply the received at least one determined media effect to the at least one media segment.

14. The computer readable storage medium of claim 12, further comprising analyzing logic configured to analyze the at least one media segment to determine the at least one media attribute.

15. The computer readable storage medium of claim 12, wherein the at least one media segment includes at least one of the following: audio, image, and video.

16. The computer readable storage medium of claim 12, further comprising:
determining logic configured to determine not to apply the at least one received media attribute;
second sending logic configured to send a request for at least one different media effect; and
third receiving logic configured to receive the at least one different media effect.

17. The computer readable storage medium of claim 16, further comprising applying logic configured to apply the at least one different media effect.

18. A method for collaborative editing, comprising:
receiving an indication to include a first media effect with a first media segment;
sending a first media attribute associated with the first media segment to a remote server, wherein the media attribute is syntax or context data including information related to time, brightness or semantic; and
receiving data related to a first media effect, the first media effect being determined from the first media attribute and rating data, wherein the rating data is provided by a plurality of users performing collaborative editing, and wherein the remote server is configured to receive the first media attribute associated with the first media segment for predicting a second media effect for a second media segment.

19. The method of claim 18, further comprising:
sending an indication to include a second media effect with the second media segment; and
receiving data related to the predicted second media effect.

20. The method of claim 1, wherein the at least one media attribute includes one or more of panoramic views, multiple segments, and news broadcast.

21. The system of claim 6, wherein the at least one media attribute includes one or more of panoramic views, multiple segments, and news broadcast.

22. The computer readable storage medium of claim 12, wherein the at least one media attribute includes one or more of panoramic views, multiple segments, and news broadcast.

* * * * *